US009880338B2

(12) United States Patent
Yamakawa (10) Patent No.: US 9,880,338 B2
(45) Date of Patent: Jan. 30, 2018

(54) ILLUMINATION DEVICE AND DISPLAY APPARATUS (71) Applicant: Sakai Display Products Corporation, Sakai-shi, Osaka (JP)

(72) Inventor: Ryo Yamakawa, Sakai (JP)

(73) Assignee: Sakai Display Products Corporation, Sakai-shi, Osaka (JP)

(*) Notice: Subject to any disclaimer, the term of this patent is extended or adjusted under 35 U.S.C. 154(b) by 0 days.

(21) Appl. No.: 15/022,508

(22) PCT Filed: Sep. 2, 2014

(86) PCT No.: PCT/JP2014/073061
§ 371 (c)(1),
(2) Date: Mar. 16, 2016

(87) PCT Pub. No.: WO2015/041045
PCT Pub. Date: Mar. 26, 2015

(65) Prior Publication Data
US 2016/0231490 A1 Aug. 11, 2016

(30) Foreign Application Priority Data
Sep. 17, 2013 (JP) .................... 2013-192040

(51) Int. Cl.
F21V 7/04 (2006.01)
F21V 8/00 (2006.01)

(52) U.S. Cl.
CPC .......... *G02B 6/002* (2013.01); *G02B 6/0031* (2013.01); *G02B 6/0055* (2013.01); *G02B 6/0061* (2013.01); *G02B 6/0068* (2013.01); *G02B 6/0073* (2013.01)

(58) Field of Classification Search
CPC .. G02B 6/0031; G02B 6/0055; G02B 6/0061; G02B 6/0068; G02B 6/0088; G02B 6/0073
See application file for complete search history.

(56) References Cited

U.S. PATENT DOCUMENTS

2012/0287371 A1 11/2012 Oura
2014/0340586 A1* 11/2014 Terashima ........... G02B 6/0055
348/790
2016/0370530 A1* 12/2016 Shimizu .............. G02B 6/0031

FOREIGN PATENT DOCUMENTS

| JP | 3023363 U | 4/1996 |
| JP | H10-199317 A | 7/1998 |
| JP | 2012-237826 A | 12/2012 |

OTHER PUBLICATIONS

English translation of the International Search Report for PCT/JP2014/073061 dated Nov. 4, 2014, 1 page.

* cited by examiner

Primary Examiner — Y M. Lee
(74) Attorney, Agent, or Firm — Rudy J. Ng; Bret E. Field; Bozicevic, Field & Francis LLP (57) ABSTRACT An illumination device according to one embodiment of the present invention comprises a light guide plate configured to emit light from inside through one surface of the light guide plate, a light source disposed to face a peripheral surface of the light guide plate, and a reflection sheet which is provided at a region face to the other surface of the light guide plate, which is opposite to the one surface, to reflect the light emitted by the light source toward the light guide plate. For distances between the light source and a peripheral edge part of the reflection sheet, a distance between a middle part of the light source in a peripheral edge direction of the light guide plate and a portion in the peripheral edge part of the reflection sheet corresponding to the middle part is the longest.

6 Claims, 7 Drawing Sheets

ILLUMINATION DEVICE AND DISPLAY APPARATUS

CROSS-REFERENCE TO RELATED APPLICATIONS

This application is the national phase under 35 U.S.C. § 371 of PCT International Application No. PCT/JP2014/073061 which has an International filing date of Sep. 2, 2014 and designated the United States of America.

FIELD

The present invention relates to an illumination device, in which light having been emitted by a light source and having entered a light guide plate is released from one surface of the light guide plate, and a display apparatus including the illumination device.

BACKGROUND

A liquid crystal display apparatus includes a liquid crystal display panel which has a display surface on a front side, and a backlight unit which illuminates the liquid crystal display panel from a back side of the liquid crystal display panel.

Hereinafter, a case in which the liquid crystal display panel is disposed in a vertical position will be described.

Conventionally, an edge light type backlight unit has been proposed (see Japanese Patent Laid-Open Publication No. 2012-237826, which is hereinafter referred to as Patent Document 1). The edge light type backlight unit includes a light guide plate which is rectangular provided at a back side of the liquid crystal display panel through an optical sheet group, a reflection sheet provided at a back side of the light guide plate, and a light source disposed to face a lower end face of the light guide plate. The light source is formed by mounting a plurality of LEDs disposed apart from each other in a horizontal direction on one surface of an LED substrate.

A part of light emitted by the LEDs enters the light guide plate through a lower end face of the light guide plate. Another part of the light emitted by the LEDs is made incident on the reflection sheet. The light having entered the light guide plate is emitted from a front surface of the light guide plate. The light made incident on the reflection sheet is reflected toward the light guide plate. In this case, when the reflected light enters the light guide plate, this light is also emitted from the front surface of the light guide plate.

The light emitted from the front surface of the light guide plate enters the liquid crystal display panel through diffusion, light collection, or the like by the optical sheet group.

When the liquid crystal display panel is uniformly illuminated by the backlight unit, the display surface of the liquid crystal display panel becomes uniformly bright.

However, if variations are present in a distance between each LED and the light guide plate, an amount of light having entered the light guide plate from each LED becomes uneven. The reason is that the light emitted by the LEDs away from the light guide plate is unlikely to be made incident on the light guide plate compared to the light emitted by the LEDs near the light guide plate. Thereby, the light is likely to be unevenly emitted from the front surface of the light guide plate. As a result, not only illumination by the backlight unit becomes uneven, but also brightness of the display surface of the liquid crystal display panel becomes uneven.

Then, in the display apparatus (a 'liquid crystal module' in text thereof) described in Patent Document 1, a lower portion of the light guide plate is partially in contact with the LED substrate, such that the distance between each LED and the light guide plate is constantly maintained.

SUMMARY

In the meantime, brightness of the light source is uneven in a direction in which the LEDs are juxtaposed (that is, in the horizontal direction). The reason is that the LEDs are present at both sides of an LED located on a horizontal middle part, but the LED is not present at one side of LEDs located on right or left end parts.

Accordingly, the amount of light directly having entered the light guide plate from the light source, as well as the amount of light having entered the light guide plate through the reflection by the reflection sheet from the light source becomes uneven in the horizontal direction. Thereby, the illumination by the backlight unit becomes uneven in the horizontal direction. As a result, the horizontal middle part of the display surface of the display panel is bright, and the right or left end parts become dark, such that an image quality of an image displayed on the display surface is deteriorated.

In consideration of the above-mentioned circumstances, it is a major object of the present invention to provide an illumination device capable of uniformly illuminating and a display apparatus.

An illumination device according to one embodiment of the present invention comprises a light guide plate configured to emit light from inside through one surface of the light guide plate, a light source disposed to face a peripheral surface of the light guide plate, and a reflection sheet which is provided at a region face to the other surface of the light guide plate, which is opposite to the one surface, to reflect the light emitted by the light source toward the light guide plate. For distances between the light source and a peripheral edge part of the reflection sheet, a distance between a middle part of the light source in a peripheral edge direction of the light guide plate and a portion in the peripheral edge part of the reflection sheet corresponding to the middle part is the longest.

In the illumination device according to the embodiment of the present invention, the portion in the peripheral edge part of the reflection sheet corresponding to the middle part may be formed in a concave shape.

In the illumination device according to the embodiment of the present invention, for the distances between the middle part of the light source in the peripheral edge direction and the portion in the peripheral edge part of the reflection sheet corresponding to the middle part of the light source in a direction following the peripheral edge direction, a distance corresponding to a central portion in the peripheral edge direction may be the longest, and may be configured to be continuously or stepwise decreased from the central portion to both sides in the peripheral edge direction.

A display apparatus according to one embodiment of the present invention comprises the illumination device according to the one embodiment of the present invention, and a display panel which has a display surface on a front side of the display panel. The display panel is illuminated by the illumination device from a back side of the display panel.

According to the one embodiment of the present invention, for the distances between the light source and the peripheral edge part of the reflection sheet, the distance between the middle part of the light source in the peripheral edge direction of the light guide plate (hereinafter, briefly referred to as the peripheral edge direction) and the portion in the peripheral edge part of the reflection sheet corresponding to the middle part of the light source in the peripheral edge direction is the longest.

A brightness of the light source in the middle part in the peripheral edge direction is higher than the brightness in respective both end parts in the peripheral edge direction.

Thereby, an amount of light directly having entered the light guide plate from the middle part of the light source in the peripheral edge direction is large, and the amount of light directly having entered the light guide plate from the respective both end parts of the light source in the peripheral edge direction is small. Briefly, the amount of light directly having entered the light guide plate from the light source is uneven in the peripheral edge direction.

Meanwhile, the amount of light incident on the reflection sheet from the middle part of the light source in the peripheral edge direction is more decreased than ever before, and the amount of light incident on the reflection sheet from portions other than the middle part of the light source in the peripheral edge direction is more increased than ever before. Therefore, the amount of light reflected toward inside of the light guide plate from the reflection sheet is uneven in the peripheral edge direction.

However, the amount of light reflected toward inside of the light guide plate from the reflection sheet corresponding to a portion which has a small (or large) amount of light directly having entered the light guide plate from the light source is increased (or decreased). Therefore, a total amount of light having entered the light guide plate becomes uniform in the peripheral edge direction.

Briefly, in order to make the amount of light having entered the light guide plate uniform in the peripheral edge direction, the distance between the light source and the reflection sheet is deliberately made to be uneven in the peripheral edge direction.

As a result, illumination by the illumination device becomes uniform in the peripheral edge direction.

According to the embodiment of the present invention, the portion in the peripheral edge part of the reflection sheet corresponding to the middle part of the light source in the peripheral edge direction is formed in the concave shape. Therefore, the distance between the light source and the reflection sheet becomes uneven in the peripheral edge direction.

Briefly, by forming the shape of the reflection sheet different from a conventional reflection sheet, the amount of light having entered the light guide plate may be made to be uniform in the peripheral edge direction.

Forming the shape of the reflection sheet different from the conventional reflection sheet is more simply achieved, for example, than forming the shape of the light source from a conventional light source. In other words, in the illumination device, the amount of light having entered the light guide plate may be made to be uniform in the peripheral edge direction by a simple configuration. Further, in the illumination device, the brightness of the display surface of a display panel may be made to be uniform in the peripheral edge direction by the simple configuration.

According to the embodiment of the present invention, for the distances between the middle part of the light source in the peripheral edge direction and the portion in the peripheral edge part of the reflection sheet corresponding to the middle part of the light source in the peripheral edge direction, the distance corresponding to the central portion in the peripheral edge direction is the longest, and is configured to be continuously or stepwise decreased from the central portion in the peripheral edge direction to both sides in the peripheral edge direction. Such the reflection sheet is particularly preferable in the case that the brightness of the light source is symmetric in the peripheral edge direction.

According to the illumination device and the display apparatus of the one embodiment of the present invention, by making the distance between the light source and the reflection sheet uneven in the peripheral edge direction, it is possible to make the amount of light having entered the light guide plate uniform in the peripheral edge direction. Thereby, it is possible to make illumination by the illumination device uniform in the peripheral edge direction. Further, it is possible to make the brightness of the display surface of the display panel uniform in the peripheral edge direction. Therefore, the image quality of an image displayed on the display surface of the display panel may be improved.

The above and further objects and features will more fully be apparent from the following detailed description with accompanying drawings.

DETAILED DESCRIPTION

Hereinafter, the present invention will be described in detail with reference to the accompanying drawings illustrating embodiments thereof. In the following description, upper and lower, back and front, and right and left illustrated by arrows in the drawings are used.

Embodiment 1

Figure 1:
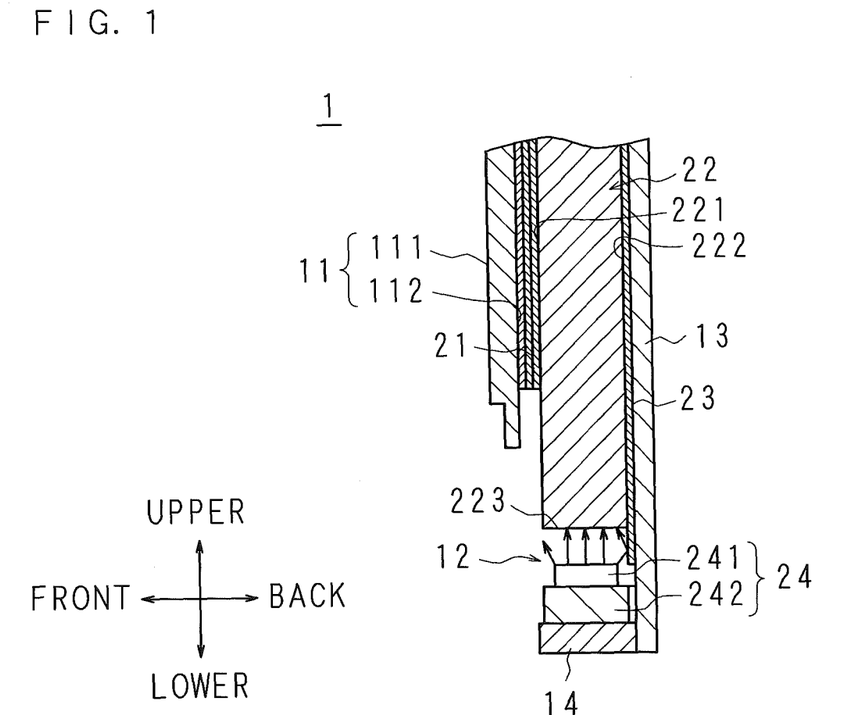
FIG. 1 is a longitudinal-sectional view schematically illustrating a configuration (a right end part or a left end part of a reflection sheet) of a display apparatus according to Embodiment 1 of the present invention.
Figure 2:
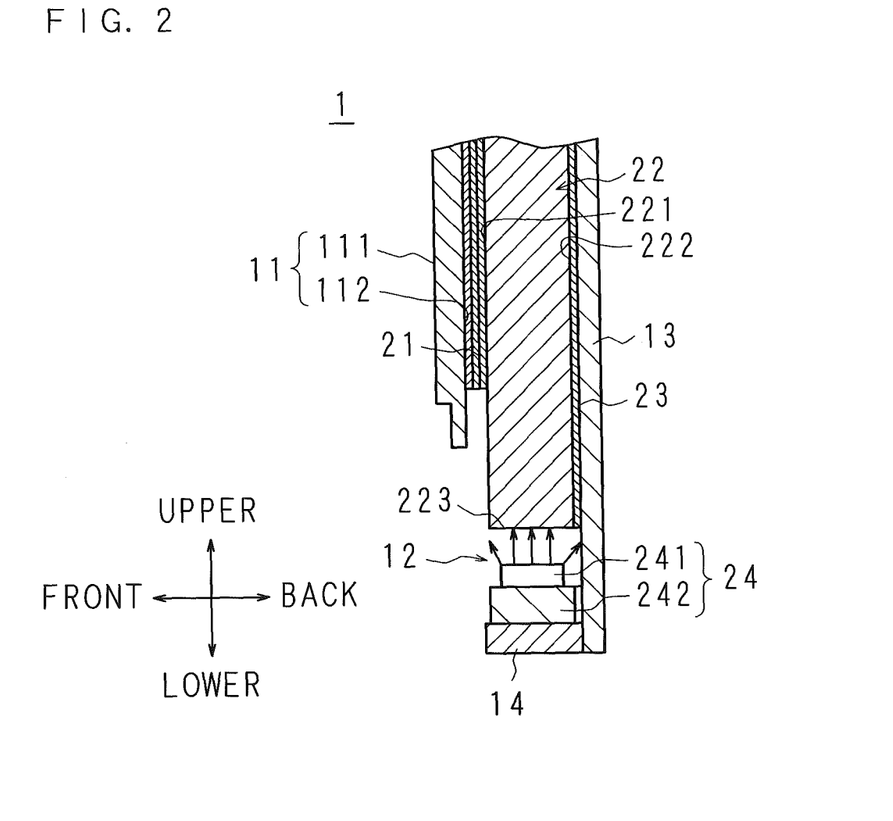
FIG. 2 is a longitudinal-sectional view schematically illustrating the configuration (a horizontal middle part of the reflection sheet) of the display apparatus.

FIGS. 1 and 2 are longitudinal-sectional views schematically illustrating a configuration of a display apparatus 1 according to Embodiment 1 of the present invention. FIGS. 1 and 2 illustrate the vicinity of a lower side part a reflection sheet 23 to be described below. And, FIG. 1 illustrates a right end part or a left end part of the reflection sheet 23, and FIG. 2 illustrates a horizontal middle part of the reflection sheet 23.

Figure 3:
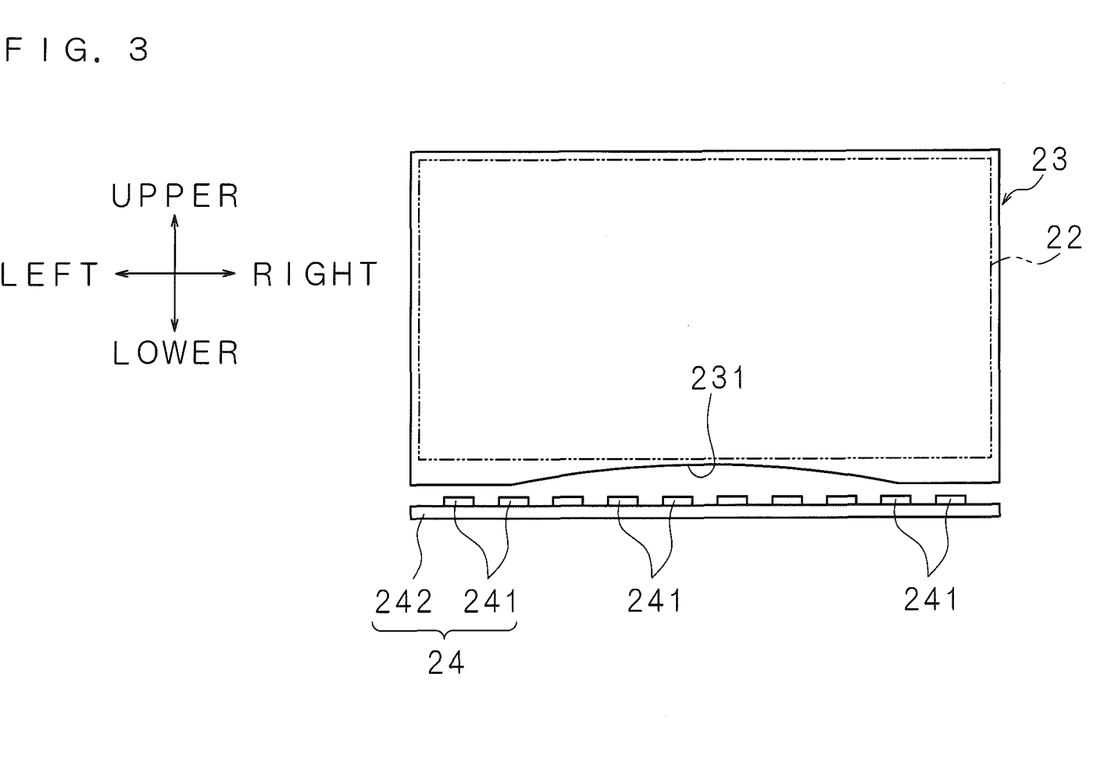
FIG. 3 is a front view schematically illustrating a positional relationship between the reflection sheet and a light source included in a backlight unit as an illumination device according to Embodiment 1 of the present invention.

FIG. 3 is a front view schematically illustrating a positional relationship between the reflection sheet 23 and a light source 24 included in a backlight unit 12 as an illumination device according to Embodiment 1 of the present invention.

The display apparatus 1 of the present embodiment is formed as, for example, a television receiving apparatus, a digital signage, a monitor for personal computer.

First, the configuration of the display apparatus 1 will be described.

The display apparatus 1 includes a display panel 11, the backlight (illumination device) 12, a backlight chassis 13, a heat sink 14, a cabinet (not illustrated) which houses these components while a display surface 111 to be described below is exposed to an outside and the like.

The cabinet is non-translucent. The light made incident on the cabinet is unlikely to be reflected compared to the light made incident on the reflection sheet 23.

The display panel 11 is formed using a liquid crystal display panel. The display panel 11 is formed in a rectangular shape, and is disposed in a vertical position. The display panel 11 has the rectangular display surface 111 on a front side thereof. The display panel 11 has a glass substrate on a side of the display surface 111 and a glass substrate on a side of a back surface 112. Liquid crystal is sealed between the two glass substrates. Light transmittance of the display panel 11 is changed depending on a voltage applied to the liquid crystal of the display panel 11.

The backlight chassis 13 is non-translucent. The light made incident on the backlight chassis 13 is unlikely to be reflected compared to the light made incident on the reflection sheet 23.

The backlight unit 12 is supported by the backlight chassis 13, the cabinet, and the like between the display panel 11 and the plate-shaped backlight chassis 13 which is disposed in a vertical position.

The backlight unit 12 has an optical sheet group 21, a light guide plate 22, the reflection sheet 23, and the light source 24.

The optical sheet group 21 is formed by laminating a plurality of optical sheets each of which is formed in a rectangular shape. The optical sheet group 21 is disposed in close contact with a middle part of the back surface 112 of the display panel 11. A length of the optical sheet group 21 in each direction of vertical and horizontal directions is larger than the length of the display surface 111 of the display panel 11 in each direction of vertical and horizontal directions. The optical sheet group 21 covers the display surface 111 of the display panel 11 from the back surface 112 side. Each optical sheet included in the optical sheet group 21 has a light diffusion function, a light collection function and the like.

The light guide plate 22 is formed in a rectangular plate shape. The light guide plate 22 may be made of an acrylic resin, for example. The length of the light guide plate 22 in each direction of horizontal and vertical directions is larger than the length of the display panel 11 in each direction of horizontal and vertical directions.

The light guide plate 22 emits (that is, surface emits) the light having entered the light guide plate 22 from a front surface (one surface) 221 of the light guide plate 22. For this purpose, the light guide plate 22 is provided with a plurality of reflection parts (not illustrated) on a back surface (the other surface which is opposite to the one surface) 222 thereof. The reflection parts are provided by performing silk printing, laser printing, molding, or the like on the back surface 222. The light made incident on the reflection parts is reflected to a region face to the front surface 221. The light having entered the light guide plate 22 is reflected at the front surface 221, back surface 222, or the reflection parts of the light guide plate 22, and finally, is released through the front surface 221 to emit to the outside of the light guide plate 22. However, a part of the light having entered the light guide plate 22 may transmit through the back surface 222 (that is, light leakage occurs).

The heat sink 14 is disposed under the light guide plate 22. The heat sink 14 is supported by the backlight chassis 13. Heat conducted to the heat sink 14 is discharged to the outside of the display apparatus 1. The light source 24 is disposed on the heat sink 14.

The light source 24 includes a plurality of LEDs 241, 241 and . . . , and an LED substrate 242.

The LED substrate 242 is non-translucent, and is formed in a laterally long rectangular shape in a horizontal position.

The LEDs 241, 241 and . . . are equidistantly mounted on an upper surface of the LED substrate 242 in a row in the horizontal direction. The LEDs 241, 241 and . . . , and a lower end face (peripheral surface) 223 of the light guide plate 22 are disposed to face each other with being spaced at an appropriate length.

The LED 241 is not provided at a left side from the left end part (or a right side from the right end part) of the light source 24. Meanwhile, the LEDs 241, 241 and . . . are provided at horizontal both sides of the middle part of the light source 24. Therefore, an amount of light emitted in the middle part of the light source 24 is larger than the amount of light emitted in the left end part (or the right end part) of the light source 24. In other words, the amount of light emitted by the light source 24 is uneven in the horizontal direction. In addition, the amount of light emitted by the light source 24 is bilaterally symmetrical.

Heat emitted by the LEDs 241, 241 and . . . is conducted to the heat sink 14 through the LED substrate 242.

The reflection sheet 23 is disposed in close contact to the back surface 222 of the light guide plate 22, and completely covers the back surface of the light guide plate 22. Accordingly, light leaked from the back surface 222 of the light guide plate 22 is reflected by the reflection sheet 23, and enters again the light guide plate 22.

The reflection sheet 23 is formed in a rectangular shape.

A length of the reflection sheet 23 in the horizontal direction (hereinafter, referred to as a horizontal length) is longer than the horizontal length of the light guide plate 22, and is the same level as the horizontal length of the light source 24.

Unlike a conventional reflection sheet 230 to be described below, the length of the reflection sheet 23 in the vertical direction (hereinafter, referred to as a vertical length) is not constant. In particular, for the vertical length of the reflection sheet 23, the vertical length in the horizontal central portion is the shortest, and the vertical length in right and left end parts is the longest. The shortest vertical length of the reflection sheet 23 is a length of the vertical length of the light guide plate 22 or more. In the horizontal middle part of the reflection sheet 23, the vertical length of the reflection sheet 23 is continuously increased from the horizontal central portion to right and left sides.

Briefly, the horizontal middle part in the lower side part (a peripheral edge part) of the reflection sheet 23 is formed in an upward-concave shape. Hereinafter, the concaved portion in the lower side part of the reflection sheet 23 is referred to as a concave part 231. A peripheral edge shape of the concave part 231 is formed in a gentle mountain shape.

The respective right and left end parts in the lower side part of the reflection sheet 23 are hung to a side being close to the LED substrate 242. In the present embodiment, the respective right and left end parts in the lower side part of reflection sheet 23 are not in contact with the LED substrate 242, but it may be in contact therewith.

As a result of the above description, for distances between the light source 24 and the lower side part of the reflection sheet 23, a distance between the horizontal middle part of the light source 24 (the middle part of the light source 24 in a peripheral edge direction of the light guide plate 22) and the horizontal middle part in the lower side part of the reflection sheet 23 (a portion in the peripheral edge part of the reflection sheet 23 corresponding to the middle part of the light source 24 in the peripheral edge direction of the light guide plate 22, that is the concave part 231) is the longest. In more detail, the distance corresponding to a central portion of the concave part 231 in the horizontal direction thereof is the longest, and the distance is continuously decreased from the central portion of the concave part 231 to the right and left sides in the horizontal direction thereof.

Further, it may be configured in such a manner that the vertical length in the horizontal middle part of the reflection sheet 23 is stepwise increased from the horizontal central portion to the right and left sides.

In addition, the peripheral edge shape of the concave part 231 is not limited to the mountain shape, and may be formed in a rectangular, a semielliptical, or a triangular shape, etc.

Next, illumination of the display panel 11 by the backlight unit 12 will be described.

Light emitted by the light source 24 enters the light guide plate 22 directly or by being reflected by the reflection sheet 23, to thus be entered through a lower end face 223 of the light guide plate 22. The light made incident on a place (for example, the cabinet, the backlight chassis 13) which is neither the lower end face 223 of the light guide plate 22 nor the reflection sheet 23 is absorbed or scattered, such that the light does not efficiently enter the lower end face 223 side of the light guide plate 22.

The light having entered the light guide plate 22 is emitted from the front surface 221 of the light guide plate 22. The light emitted from the light guide plate 22 enters the optical sheet group 21 which made light-diffusion, light-collection, or the like, and enters the display panel 11 through the back surface 112 of the display panel 11.

As described above, the display panel 11 is illuminated by the backlight unit 12 from the back surface 112 side. The light having entered the display panel 11 is transmitted through the display panel 11, or is blocked from passing through the display panel 11. As a result, an image is displayed on the display surface 111.

Next, action effects of the backlight unit 12 will be described. For this purpose, first, a difference in a configuration between the backlight unit 12 and the conventional backlight unit will be described.

Figure 4:
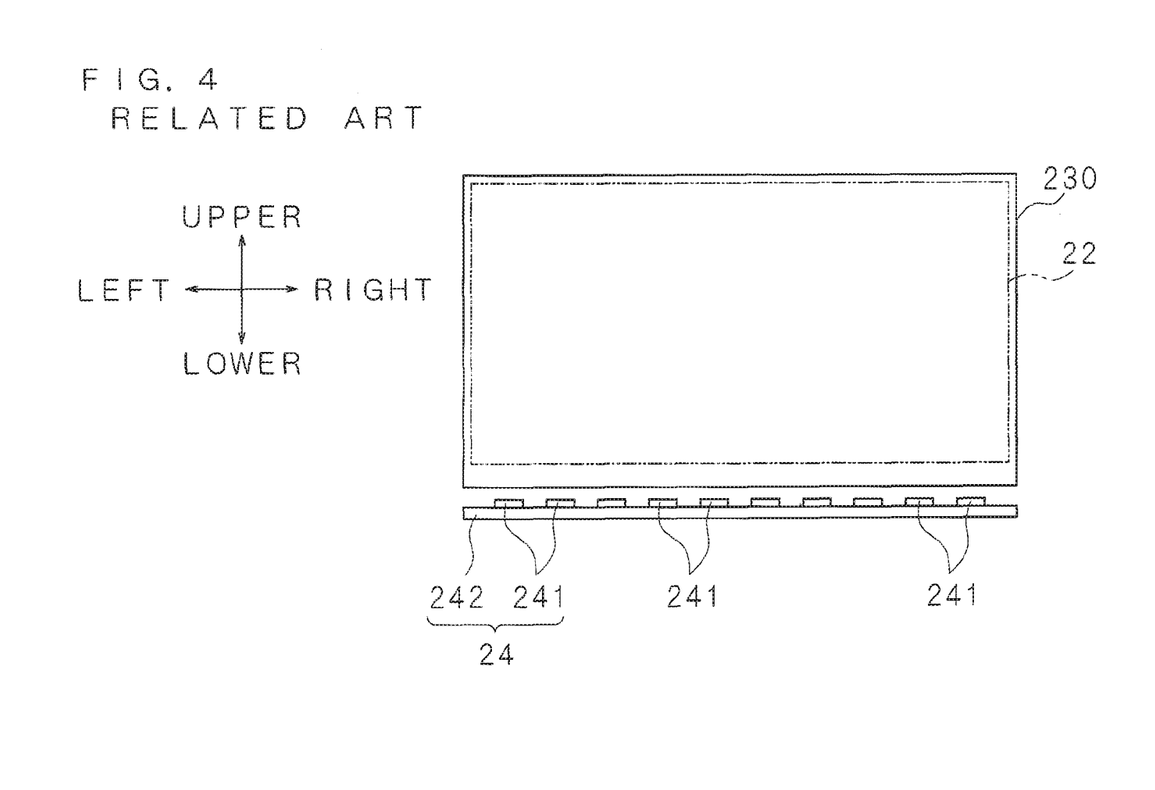
FIG. 4 is a front view schematically illustrating a positional relationship between a reflection sheet and a light source included in a conventional backlight unit.

FIG. 4 is a front view schematically illustrating a positional relationship between the reflection sheet 230 and the light source 24 included in the conventional backlight unit.

The conventional backlight unit has substantially the same configuration as the backlight unit 12. However, the conventional backlight unit includes a rectangular reflection sheet 230, instead of the reflection sheet 23.

The horizontal length of the reflection sheet 230 is equal to the horizontal length of the reflection sheet 23.

The vertical length of the reflection sheet 230 is constant. The vertical length of the reflection sheet 230 is larger than the shortest length of the reflection sheet 23 in the vertical direction, and is the length of the longest length or less.

For the conventional backlight unit, the amount of light emitted in the horizontal middle part of the light source 24 is larger than the amount of light emitted in the left end part (or the right end part) of the light source 24.

Accordingly, for the amount of light directly having entered the light guide plate 22 from the light source 24, the amount of light having entered through the horizontal middle part of the light guide plate 22 is larger than the amount of light having entered through the left end part (or the right end part) of the light guide plate 22.

Similarly, the amount of light having entered through the horizontal middle part of the reflection sheet 230 from the light source 24 is larger than the amount of light having entered through the left end part (or the right end part) of the reflection sheet 230 from the light source 24. Therefore, for the amount of light having entered the light guide plate 22 through the reflection by the reflection sheet 230, the amount of light having entered through the horizontal middle part of the light guide plate 22 is larger than the amount of light having entered through the left end part (or the right end part) of the light guide plate 22.

Thereby, surface emission of the light guide plate 22 in the horizontal direction becomes uneven. In particular, the horizontal middle part of the light guide plate 22 is bright, and the right and left end parts become dark.

If the unevenness in the horizontal direction relating to the surface emission of the light guide plate 22 is not resolved by a diffusion function of the optical sheet group 21, illumination by the conventional backlight unit becomes uneven in the horizontal direction. Accordingly, the brightness of the display surface 111 of the display panel 11 becomes uneven in the horizontal direction.

In the meantime, when the reflection sheet 230 is replaced by a reflection sheet 230 having a vertical length of 1.5 mm longer in the downward direction, luminance in the surface emission of the light guide plate 22 is increased by 18%. This indicates that the shortening/lengthening of the distance from the reflection sheet 230 to the light source 24 and the increasing/decreasing of the luminance in the surface emission of the light guide plate 22 have a correlation with each other.

Briefly, with the distance from the light source 24 to the reflection sheet 230 being decreased (or increased), the amount of light having entered the light guide plate 22 through the reflection by the reflection sheet 230 is increased (or decreased), and the luminance in the surface emission of the light guide plate 22 is increased (or decreased). The reason is that, with the distance from the light source 24 to the reflection sheet 230 being decreased (or increased), the light is likely to be made incident (is unlikely to be made incident) on the reflection sheet 230 from the light source 24, and with the light being likely to be made incident (being unlikely to be made incident), the amount of light incident on the reflection sheet 230, and correspondingly, an amount of light reflected by the reflection sheet 230 is increased (or decreased).

In this regard, also for the backlight unit 12, the amount of light emitted in the horizontal middle part of the light source 24 is larger than the amount of light emitted in the left end part (or the right end part) of the light source 24. Accordingly, for the amount of the light directly having entered the light guide plate 22 from the light source 24, the amount of light having entered through the horizontal middle part of the light guide plate 22 is larger than the amount of light having entered through the left end part (or the right end part) of the light guide plate 22.

However, the amount of light having entered through the horizontal middle part of the reflection sheet 23 from the light source 24 is smaller than the amount of light having entered through the left end part (or the right end part) of the reflection sheet 23 from the light source 24. The reason is that the distance from the horizontal middle part of the light source 24 to the horizontal middle part of the reflection sheet 23 is larger than the distance from the left end part (or the right end part) of the light source 24 to the left end part (or the right end part) of the reflection sheet 23. Therefore, for the amount of light having entered the light guide plate 22 through the reflection by the reflection sheet 23, the amount of light having entered through the horizontal middle part of the light guide plate 22 is smaller than the amount of light having entered through the left end part (or the right end part) of the light guide plate 22.

As a result of the above description, a total amount of light having entered the light guide plate 22 becomes uniform in the horizontal direction. The reason is that, so to speak, the unevenness in the horizontal direction relating to the amount of light directly having entered the light guide plate 22 from the light source 24 is complemented by the unevenness in the horizontal direction relating to the amount of light having entered the light guide plate 22 from the light source 24 through the reflection sheet 23.

Thereby, the surface emission of the light guide plate 22 becomes uniform in the horizontal direction. Therefore, the illumination by the backlight unit 12 becomes uniform in the horizontal direction. Accordingly, the display surface 111 of the display panel 11 becomes uniformly bright in the horizontal direction.

In the display apparatus 1 including the above-described backlight unit 12, the display surface 111 of the display panel 11 is uniformly bright in the horizontal direction, such that an image quality of the image displayed on the display surface 111 may be improved.

Further, when the backlight unit 12 includes the reflection sheet 230, it may include an LED substrate whose horizontal middle part is bent downward, an LED substrate whose horizontal middle part is located under from the right and left end parts so as to be provided in a stepped shape, or the like, instead of the LED substrate 242 of the light source 24. According to the above-described configuration, since the horizontal middle part of the reflection sheet 230 and the horizontal middle part of the light source 24 are relatively spaced from each other, and the right and left end parts of the reflection sheet 230 and the right and left end parts of the light source 24 are relatively close to each other, the total amount of light having entered the light guide plate 22 may become uniform in the horizontal direction.

However, the above-described LED substrate is unusual. In addition, a space in which the LED substrate is disposed may be vertically increased. Accordingly, as in the present embodiment, using the reflection sheet 23 is advantageous.

In the present embodiment, since the amount of light emitted by the light source 24 is bilaterally symmetrical, the reflection sheet 23 is also formed in a bilaterally symmetrical shape. Therefore, if the amount of light emitted by the light source 24 is bilaterally unsymmetrical, the reflection sheet 23 may be also formed in a bilaterally unsymmetrical shape.

Further, in the present embodiment, the light source 24 is disposed to face the lower end face 223 of the light guide plate 22. However, the backlight unit 12 may include the light source 24 disposed to face the lower end face 223 of the light guide plate 22, and a light source 24 disposed to face an upper end face of the light guide plate 22, instead of the lower end face 223 of the light guide plate 22. In this case, a part corresponding to the concave part 231 may be provided at a part of an upper side part of the reflection sheet 23.

Embodiment 2

Figure 5:
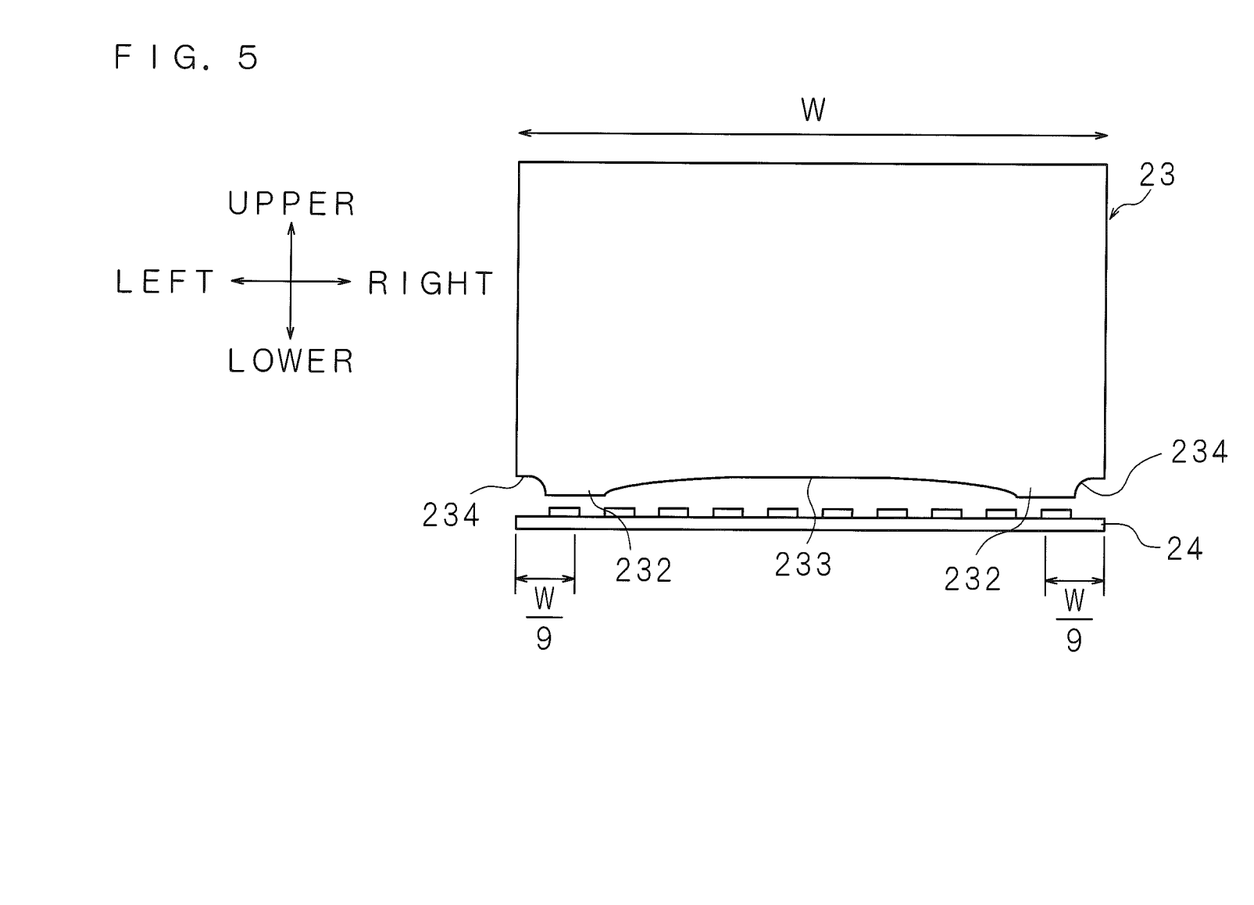
FIG. 5 is a front view schematically illustrating a positional relationship between a reflection sheet and a light source included in a backlight unit according to Embodiment 2 of the present invention.

FIG. 5 is a front view schematically illustrating a positional relationship between a reflection sheet 23 and a light source 24 included in a backlight unit 12 according to Embodiment 2 of the present invention. FIG. 5 corresponds to FIG. 3 of Embodiment 1.

The backlight unit 12 of the present embodiment has substantially the same configuration as the backlight unit 12 of Embodiment 1. Hereinafter, a difference from Embodiment 1 will be described, and the other portions corresponding to Embodiment 1 will be denoted by the same reference numerals, and will not be described.

In general, in the right and left end parts of the display surface 111 of the display panel 11, it is less likely to display an important image compared to the horizontal middle part thereof. Therefore, some users may desire that a range for displaying the important image is more uniformly bright than that the display surface 111 is entirely uniformly bright in the horizontal direction. For such the users, it is preferable that the right and left end parts of the display surface 111 are relatively darker than the horizontal middle part thereof as in the prior art.

For this purpose, the reflection sheet 23 of the present embodiment does not have the concave part 231, unlike the reflection sheet 23 of Embodiment 1.

When the horizontal length of the reflection sheet 23 is set to be a horizontal length W, the reflection sheet 23 is provided with convex parts 232 and 232 in the lower side part thereof at positions of a distance $\{W/9\}$ from the right and left end parts. A concave part 233 is present between the convex parts 232 and 232, and concave parts 234 and 234 are present at right and left sides from the convex parts 232 and 232.

Accordingly, for the distances between the light source 24 and the lower side part of the reflection sheet 23, both of the distance between the horizontal middle part of the light source 24 and the horizontal middle part (that is, the concave part 233) in the lower side part of the reflection sheet 23, and the distance between the right and left end parts of the light source 24 and the right and left end parts (that is, the concave parts 234 and 234) in the lower side part of the reflection sheet 23 are the longest.

When using the above-described reflection sheet 23, for the surface emission of the light guide plate 22, narrow ranges of the right and left end parts are relatively dark, and a wide range of the horizontal middle part becomes relatively bright and uniform. As a result, it is possible to set the brightness of the display surface 111 of the display panel 11 to a level desired by the user.

Embodiment 3

Figure 6:
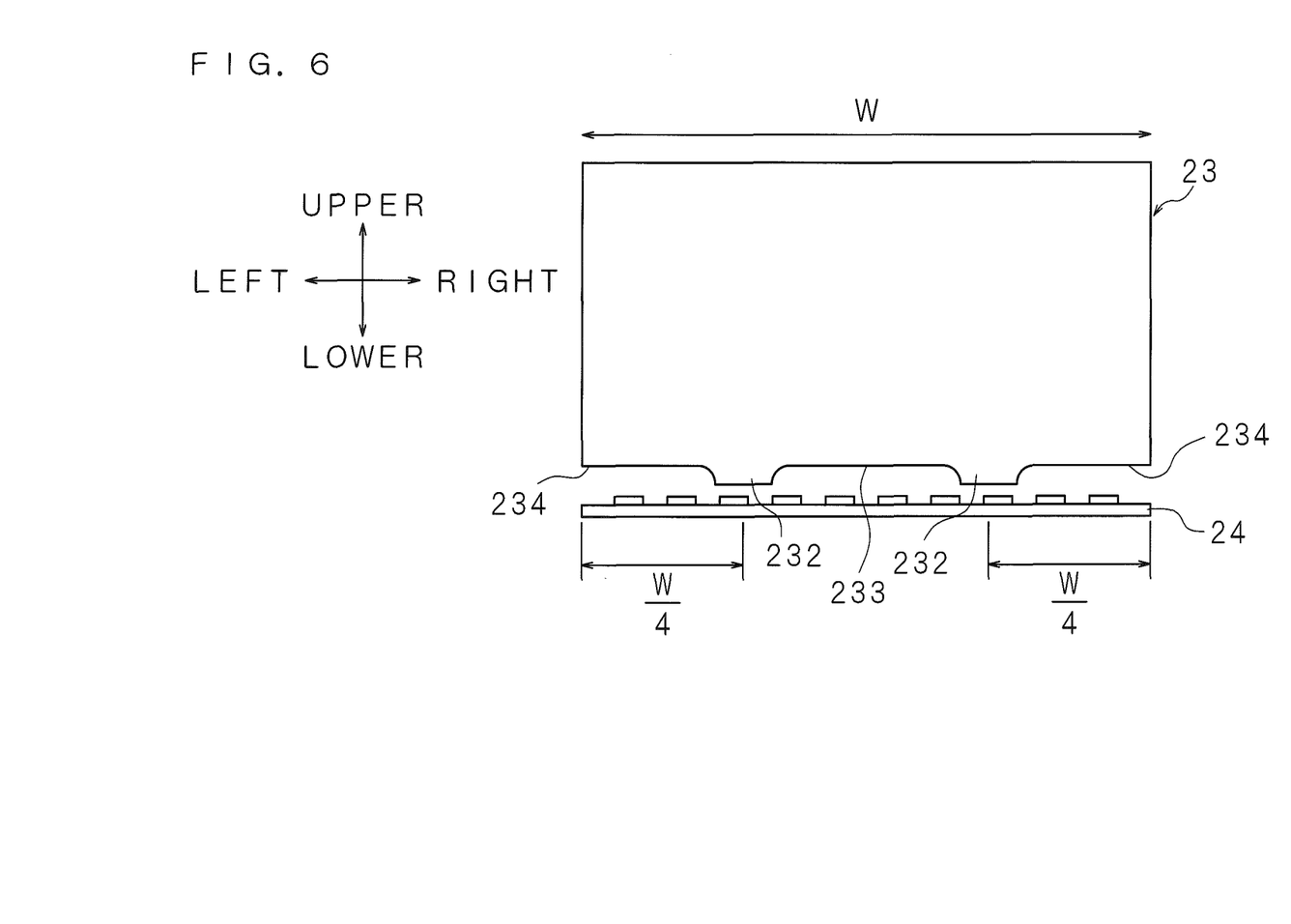
FIG. 6 is a front view schematically illustrating a positional relationship between a reflection sheet and a light source included in a backlight unit according to Embodiment 3 of the present invention.

FIG. 6 is a front view schematically illustrating a positional relationship between a reflection sheet 23 and a light source 24 included in a backlight unit 12 according to Embodiment 3 of the present invention. FIG. 6 corresponds to FIG. 5 of Embodiment 2.

The backlight unit 12 of the present embodiment has substantially the same configuration as the backlight unit 12 of Embodiment 2. Hereinafter, a difference from Embodiment 2 will be described, and the other portions corresponding to Embodiment 2 will be denoted by the same reference numerals, and will not be described.

In the case of Embodiment 2, the convex parts 232 and 232 are disposed in the arrangement at positions of the distance {W/9} from the right and left end parts of the reflection sheet 23, but in the case of the present embodiment, the convex parts 232 and 232 are disposed in the arrangement at positions of a distance {W/4} from the right and left end parts of the reflection sheet 23.

When using the above-described reflection sheet 23, for the surface emission of the light guide plate 22, the right and left end parts are relatively dark, and the horizontal middle part becomes relatively bright and uniform. However, the relatively dark range of the right and left end parts are wider than the case of Embodiment 2, and the relatively bright range of the horizontal middle part is narrower than the case of Embodiment 2.

As can be seen from Embodiments 2 and 3, by appropriately designing the shape of the reflection sheet 23, the surface emission of the light guide plate 22 may be made to be uniform in a required range. Therefore, the required range may be uniformly illuminated by the backlight unit 12. As a result, the display apparatus 1 is capable of improving the image quality of the image displayed on the display surface 111 as desired by the user.

Embodiment 4

Figure 7:
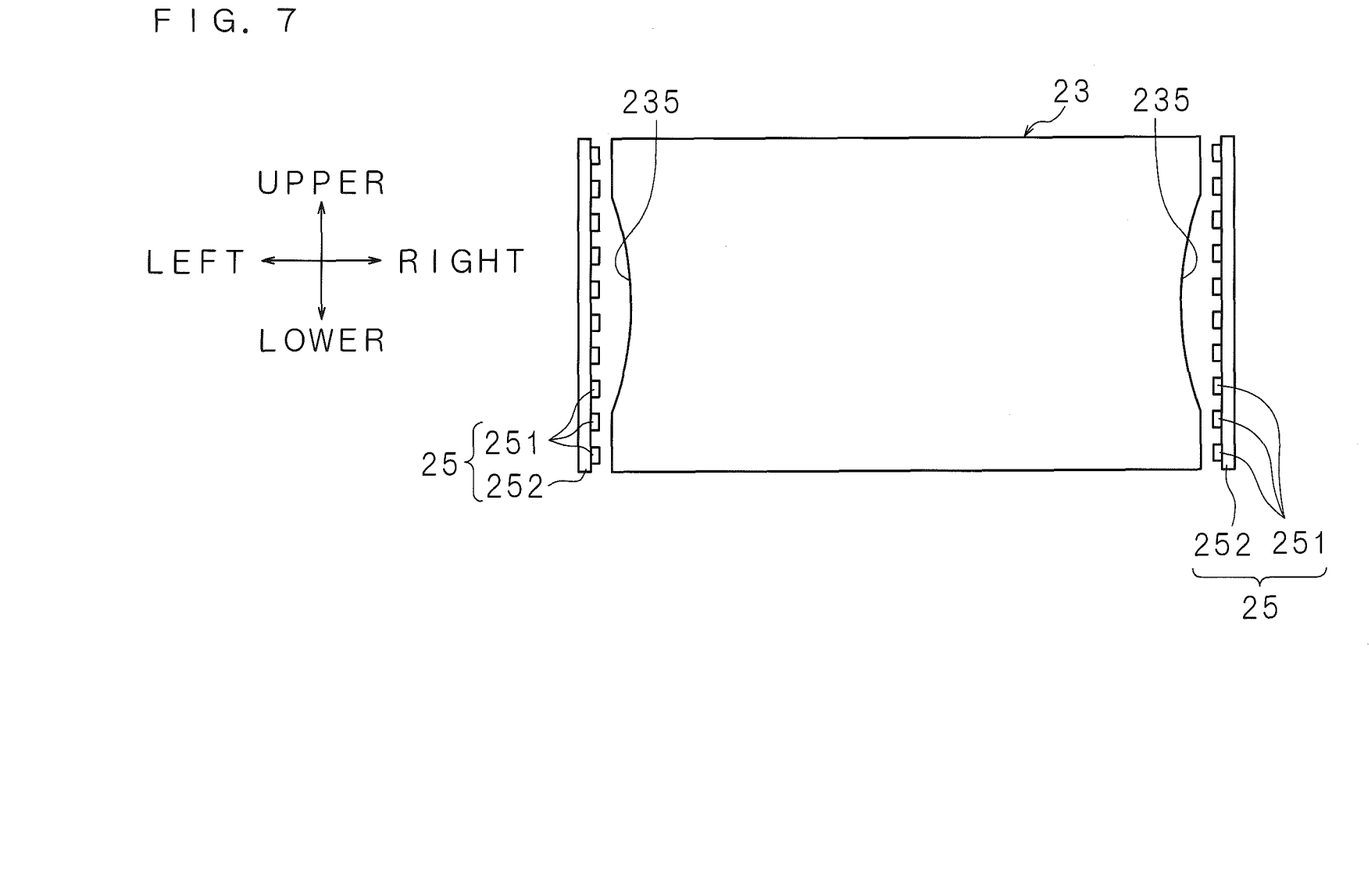
FIG. 7 is a front view schematically illustrating a positional relationship between a reflection sheet and a light source included in a backlight unit according to Embodiment 4 of the present invention.

FIG. 7 is a front view schematically illustrating a positional relationship between a reflection sheet 23 and a light source 24 included in a backlight unit 12 according to Embodiment 4 of the present invention. FIG. 7 corresponds to FIG. 3 of Embodiment 1.

The backlight unit 12 of the present embodiment has substantially the same configuration as the backlight unit 12 of Embodiment 1. Hereinafter, a difference from Embodiment 1 will be described, and the other portions corresponding to Embodiment 1 will be denoted by the same reference numerals, and will not be described.

The backlight unit 12 of Embodiment 1 is an edge light type in which the light source 24 is disposed under the light guide plate 22.

Meanwhile, the backlight unit 12 of the present embodiment is a side edge light type in which light sources 25 and 25 are provide at right and left sides of the light guide plate 22.

Thereby, the backlight unit 12 includes a heat sink (not illustrated) which serves to exhaust heat respectively generated from the light sources 25 and 25 and the light sources 25 and 25, instead of the light source 24 and the heat sink 14 of Embodiment 1.

In addition, the reflection sheet 23 has concave parts 235 and 235, instead of the concave part 231 unlike the reflection sheet 23 of Embodiment 1.

Each light source 25 includes LEDs 251, 251 and . . . , and an LED substrate 252 substantially the same as the LEDs 241, 241 and . . . , and the LED substrate 242 of light source 24.

The LED substrate 252 is non-translucent, and is formed in a vertically long rectangular shape in a vertical position. The LED substrate 252 is disposed so that one surface thereof faces a side end face (a left side end face or a right side end face) of the light guide plate 22.

The LEDs 251, 251 and . . . are equidistantly mounted on one surface of the LED substrate 252 in a row in the vertical direction. The LEDs 251, 251 and . . . , and the side end face of the light guide plate 22 are disposed to face each other with being spaced at an appropriate length.

The amount of light emitted by the light source 25 is uneven in the vertical direction. In addition, the amount of light emitted by the light source 25 is top-bottom symmetrical.

The horizontal length of the reflection sheet 23 is uneven in the vertical direction. For this purpose, the vertical middle part in a left side part of the reflection sheet 23 is formed in a rightward-concave shape. Similarly, the vertical middle part in a right side part of the reflection sheet 23 is formed in a leftward-concave shape. The concave parts 235 and 235 are concaved-portions in the right and left side parts of the reflection sheet 23.

Light emitted by the light sources 25 and 25 enters the light guide plate 22 directly or by being reflected by the reflection sheet 23, to thus be entered through both side end faces of the light guide plate 22.

The above-described backlight unit 12 and the display apparatus 1 achieve the same action effects as the backlight unit 12 and the display apparatus 1 of Embodiment 1 in the vertical direction.

That is, in the respective upper and lower end parts of the light guide plate 22, the unevenness in the vertical direction relating to the amount of light directly having entered the light guide plate 22 form the light source 25 is complemented by the unevenness in the vertical direction relating to the amount of light having entered the light guide plate 22 from the light source 25 through the reflection sheet 23, and the total amount of light having entered the light guide plate 22 becomes uniform in the vertical direction.

Thereby, the surface emission of the light guide plate 22 becomes uniform in the vertical direction. Therefore, the illumination by the backlight unit 12 becomes uniform in the vertical direction. Accordingly, the display surface 111 of the display panel 11 becomes uniformly bright in the vertical direction.

In the display apparatus 1 including the above-described backlight unit 12, the display surface 111 of the display panel 11 is uniformly bright in the vertical direction, such that the image quality of the image displayed on the display surface 111 may be improved.

Further, the backlight unit 12 may have a configuration which includes only the left (or right) light source 25. In this case, it is not necessary to provide the right (or left) concave part 235 of the reflection sheet 23.

The illumination device according to the present embodiments of the present invention is not limited to the illumination device such as the backlight unit 12 incorporated in the display apparatus 1. For example, the illumination device may be configured as a backlight of a display unit provided in mobile phones, portable information communication terminals or the like. Alternately, the illumination device may be configured as a ceiling light, a wall mounted illumination device or the like. When configuring as the ceiling light, for example, the light guide plate may be disposed in a horizontal position such that the front thereof is downward.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

In addition, as long as having the effects of the present invention, components which are not disclosed in Embodiments 1 to 4 may be included in the display apparatus 1 or the backlight unit 12.

Components (technical characteristics) disclosed in each embodiment may be combined with each other, and by combining these components, new technical characteristics may be formed.

It is noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. An illumination device comprising:
a light guide plate configured to emit light from one surface of the light guide plate;
a light source disposed to face an edge face of the light guide plate, the light source having a plurality of LEDs juxtaposed on a substrate in a peripheral edge direction of the light guide plate; and
a reflection sheet which is provided at a region facing the other surface of the light guide plate to reflect the light emitted by the light source toward the light guide plate, wherein,
the reflection sheet has a first area facing the other surface of the light guide plate and a second area protruding beyond the edge face from the first area,
for distances between the light source and a peripheral edge part of the reflection sheet, a distance between a middle part of the light source in a peripheral edge direction of the light guide plate and a portion in the peripheral edge part of the reflection sheet corresponding to the middle part of the light source is greater than a distance between end parts of the light source in the peripheral edge direction of the light guide plate and portions in the peripheral edge part of the reflection sheet corresponding to the end parts of the light source, so that a middle part of the reflection sheet has a distance from the peripheral edge of the reflection sheet to the light source that is greater than a distance from end parts of the peripheral edge of the reflection sheet to the light source, and
a total amount of light of an amount of a first light directly having entered the light guide plate from the light source and an amount of a second light having entered the light guide plate from the light source through the second area of the reflection sheet is uniform in the peripheral edge direction of the light guide plate.

2. The illumination device according to claim 1, wherein the portion in the peripheral edge part of the reflection sheet corresponding to the middle part of the light source is formed in a concave shape, which corresponds to two or more LEDs among the plurality of LEDs.

3. The illumination device according to claim 1, wherein, for the distances between the middle part of the light source in the peripheral edge direction and the portion in the peripheral edge part of the reflection sheet corresponding to the middle part of the light source in the peripheral edge direction, a distance corresponding to a central portion in the peripheral edge direction is the longest, and is configured to be continuously decreased from the central portion to both sides in the peripheral edge direction, and a distance corresponding to each of both end portions in the peripheral edge direction is the shortest.

4. A display apparatus comprising:
the illumination device according to claim 1;
a display panel which has a display surface on a front side of the display panel, and is illuminated by the illumination device from a back side of the display panel; and
a chassis that is in contact with an entire back side of the reflection sheet.

5. The illumination device according to claim 1, wherein, the second area spreads entirely in the peripheral edge direction of the light guide plate.

6. The illumination device according to claim 1, wherein, the first light reaches to the edge face directly from the light source, and
the second light reaches to the edge face from the light source by reflected at the second area of the reflection sheet toward the edge face after emission from the light source toward the second area of the reflection sheet.

* * * * *